July 15, 1941.  A. W. DETJEN  2,249,704

PISTON EXPANDER

Filed Jan. 6, 1940

INVENTOR:
ALBERT W. DETJEN,
By J. Henry Kinealy
ATTORNEY.

Patented July 15, 1941

2,249,704

UNITED STATES PATENT OFFICE 2,249,704

PISTON EXPANDER

Albert W. Detjen, Glendale, Mo., assignor to McQuay-Norris Manufacturing Company, St. Louis, Mo., a corporation of Delaware Application January 6, 1940, Serial No. 312,769

11 Claims. (Cl. 309—12)

My invention relates to piston expanders and more particularly to piston expanders of a type designed to extend across the hollow interior of the piston and to increase the effective diameter of the piston skirt in a direction along a line substantially at right angles to the axis of the piston pin.

Heretofore, a piston expander has been made which comprised two portions bowed relative to one another so that when the bowed portions were moved toward or away from one another the length of the expander would be increased or decreased and, in turn, the expansive force created in the bowed portions and exerted by the ends of the expander against the piston skirt could be increased or decreased to adjust and control the expansion of the piston skirt to obtain the proper fit of a piston within its cylinder.

The objects of this invention are to provide an expander of the type above described and formed of spring wire, to provide an expander which will be adjustable so that the expansive force created thereby against the piston skirt may be adjusted and controlled, and to provide a piston expander which will be simple in design, cheap in manufacture, and efficient and efficacious in operation.

Figure 1:
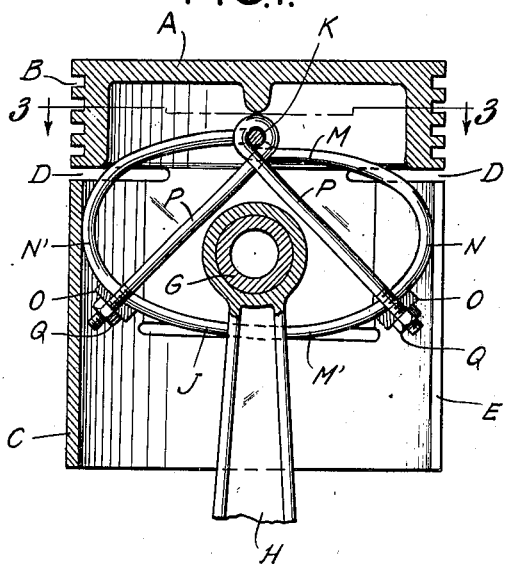
Figure 2:
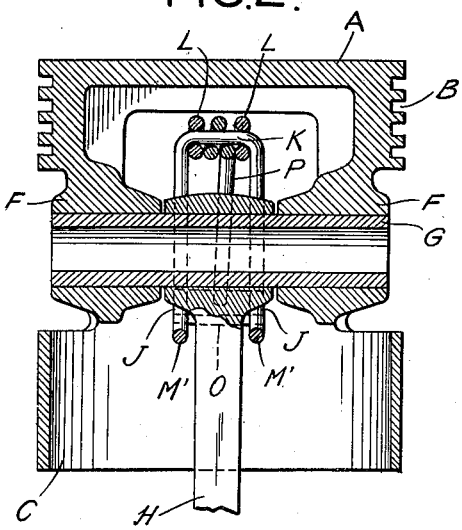
Figure 3:
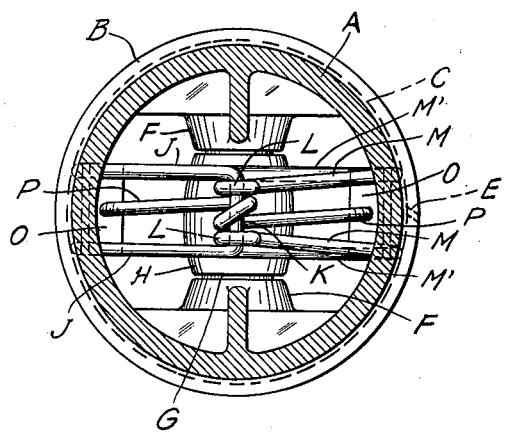
Figure 4:
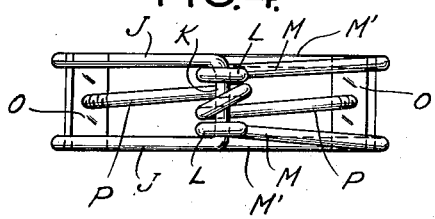
Figure 5:
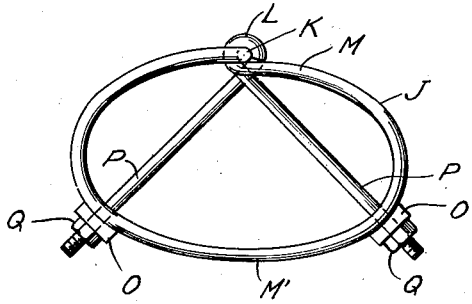

One embodiment of a piston expander including my invention in a simple form is shown in the accompanying drawing wherein similar characters are used to designate similar parts. In the drawing Fig. 1 is a sectional view of a piston including the expander; Fig. 2 is a section taken at right angles to that of Fig. 1; Fig. 3 is a cross section of the piston along the lines 3—3 in Fig. 1; and Figs. 4 and 5 show the expander removed from the piston and in plan and elevation, respectively.

Referring to the figures the piston shown as including my new and improved expander comprises a head A having the usual ring belt B and a skirt C separated from the head throughout most of its periphery by circumferentially extending slots D. Also, to provide for great resiliency in the skirt it may be split axially as at E. The piston also includes the usual pair of diametrically opposed pin bosses F arranged to receive the piston pin G on which is mounted the upper end of a connecting rod H.

As stated hereinbefore, this embodiment of my new and improved expander is made of spring wire of suitable gauge and hardness. The expander proper may be formed from a single piece of wire bent, as shown, to form a pair of generally oval shaped members J spaced apart and arranged coincident with one another. This is accomplished in the embodiment shown by bending the material to form an integral arm K extending between and spacing apart the members J and then, after the members J have been formed, by looping firmly the free ends of the wire around the arm K as at L so that, in effect, each of the members J are continuous strips of wire and having a substantially closed periphery. If the expander is formed in this manner each member J will have a pair of longitudinal portions M and M' bowed preferably outwardly, relative to one another and end portions N and N' arranged between the longitudinal portions M and M' and adapted to engage the inner surface of the piston skirt at opposed points.

It will be obvious that if the portions M and M' in each member J are moved relatively away from each other so that the distance between these portions is increased, the length of the expander, that is the distance separating the end portions N and N', will be decreased and, to the contrary, if the portions M and M' are brought closer together the end portions N and N' will be separated to increase the length of the expander. When the expander is in place in a piston with the end portions engaging the inner surface of the piston skirt, this lengthening of the expander by relative movement of the portions M and M' will increase the expansive force created by the expander and exerted by the end portions outwardly against the piston skirt.

The relative movement or adjustment of the portions M and M' to change the expansive force exerted by the expander may be accomplished in any one of a number of different ways. However, in this embodiment the portions M of the pair of members J are connected by bars O each of which has its ends welded, soldered or otherwise suitably secured to the members J. A piece of spring wire P or other suitable material is bent around or otherwise fixed to the loop K at the top of the expander and is then arranged to form diverging legs each of which passes through a suitable hole formed in one of the bars O. Each of the legs has its end threaded to receive a nut Q. When the nuts Q are tightened the members M and M' will be moved toward one another and when the nuts are loosened the parts M and M' will be allowed to move away from one another.

The use of this embodiment of my invention is as follows: The assembled expander comprising the members J and the adjusting part P is moved upwardly into the hollow interior of the piston from which the connecting rod H and pin G have been removed, until the end portions N and N' of the parts J are in the position shown in Figs. 1 and 2 of the drawing. In this position the end portions of each member J will engage the inner surface of the piston skirt at opposed points removed substantially ninety (90°) degrees from the pin bosses. The nuts Q are then tightened uniformly by any suitable tool until the expander has increased the effective diameter of the piston skirt to the proper amount. I prefer that during the adjusting operation the piston be slipped into its cylinder so that the skirt can be expanded to obtain a good fit between it and the cylinder wall. If the expander is arranged in the piston as shown, the diameter of the skirt will be increased along a line substantially at right angles to the axis of the pin bosses to compensate for wear from previous operation of the engine. The form of expander shown and described herein is designed so that when in place in the piston the longitudinal portions M of the members J will be positioned above the pin bosses and the longitudinal portions M' will be positioned below the bosses. Therefore, when the wrist pin G and the connecting rod H are assembled in the piston the pin will pass through the expander and the connecting rod H will extend between the portions M' as shown in Fig. 2. Therefore, if the expander becomes dislodged during operation from its place within the piston it will be prevented from falling into the crank case of the engine, since the expander encircles the wrist pin.

It will be obvious that piston expanders embodying my invention may be made in other forms and arrangements of parts to satisfy the objects of my invention as stated above. In some instances a single member J, instead of the pair of members as shown herein, may be strong enough to expand the piston skirt effectively. In other embodiments the size, shape, and relative arrangement of the parts may be changed in other ways without deviating from the spirit of my invention as included in the appended claims.

What I claim as new and desire to secure by Letters Patent is:

1. An expander for a piston skirt comprising a member formed of spring wire and having portions bowed relative to one another and also having portions adapted to engage the piston skirt at opposed points, and means for moving said bowed portions away from or toward one another whereby the expansive force exerted by said end portions against said skirt may be adjusted.

2. An expander for a piston skirt comprising a member formed of spring wire and having portions bowed relative to one another and also having portions adapted to engage the piston skirt at opposed points, and said expander being adapted to be arranged in a piston whereby one of said portions will extend across the hollow interior thereof above the wrist pin and the other of said portions will extend across the hollow interior below said wrist pin.

3. An expander for a piston skirt comprising a member formed of spring wire and having portions bowed relative to one another and also having portions adapted to engage the piston skirt at opposed points, said expander being adapted to be arranged in a piston whereby one of said portions will extend across the hollow interior thereof above the wrist pin and the other of said portions will extend across the hollow interior below said wrist pin, and means for moving said bowed portions away from or toward one another whereby the expansive force exerted by said end portions against said skirt may be adjusted.

4. An expander for a piston skirt comprising a member formed of spring wire, said member being of general oval shape and comprising a pair of longitudinal portions bowed outwardly relative to one another and terminating in end portions adapted to engage the piston skirt at opposed points, and said expander being adapted to be arranged in a piston whereby one of said portions will extend across the hollow interior thereof above the wrist pin and the other of said portions will extend across the hollow interior below said wrist pin.

5. An expander for a piston skirt comprising a member formed of spring wire, said member being of general oval shape and comprising a pair of longitudinal portions bowed outwardly relative to one another and terminating in integral end portions adapted to engage the piston skirt at opposed points, said expander being adapted to be arranged in a piston whereby one of said portions will extend across the hollow interior thereof above the wrist pin and the other of said portions will extend across the hollow interior below said wrist pin, and means for moving said longitudinal portions relative to one another whereby the expansive force exerted by said end portions against said skirt may be adjusted.

6. An expander for a piston skirt comprising a pair of members formed of spring wire, means for holding said members in spaced relative position, each of said members having a pair of longitudinal portions bowed relative to one another and also having portions adapted to engage the piston skirt at opposed points and joining said longitudinal portions to each other.

7. An expander for a piston skirt comprising a pair of members formed of spring wire, means for holding said members in spaced relative position, each of said members having longitudinal portions bowed outwardly relative to one another and terminating in end portions adapted to engage the piston skirt at opposed points, and means for moving the longitudinal portions of each of said members away from and toward one another whereby the expansive force exerted by said end portions against said skirt may be adjusted.

8. An expander for a piston skirt comprising a pair of members formed of spring wire, means for holding said members in spaced relative position, each of said members having longitudinal portions bowed outwardly relative to one another and terminating in integral end portions adapted to engage the piston skirt at opposed points, and said expander being adapted to be arranged in a piston whereby one of said longitudinal portions of each of said members will extend across the hollow interior of said piston above the wrist pin and the other longitudinal portion of each of said members will extend across the hollow interior below said wrist pin.

9. An expander for a piston skirt comprising a pair of generally oval shaped members formed of spring wire, means for holding said members in spaced relative position, each of said members having longitudinal portions bowed outwardly relative to one another and terminating in integral end portions adapted to engage the piston skirt at opposed points, said expander being shaped and arranged whereby one of said longitudinal portions of each of said members will extend across the hollow interior of said piston above the wrist pin and the other longitudinal portion of each of said members will extend across the hollow interior below said wrist pin, and means for moving the longitudinal portions of each of said members away from and toward one another whereby the expansive force exerted by said end portions against said skirt may be adjusted.

10. An expander for a piston skirt comprising a member formed of spring wire and having portions bowed relative to one another and also having portions adapted to engage the piston skirt at opposed points, said bowed portions and said engaging portions forming together a body of substantially oval shape and being arranged so that said member has a substantially closed periphery and encircles the wrist pin of said piston.

11. An expander for a piston skirt comprising a pair of members formed of spring wire, means for holding said members in spaced relation, said members having portions under compression and bowed relative to one another and also having portions adapted to engage the piston skirt at opposed points, said engaging portions joining said bowed portions and together forming a body of substantially oval shape so that said members have a substantially closed periphery and encircle the wrist pin of said piston.

ALBERT W. DETJEN.